(12) United States Patent
Baseman et al.

(10) Patent No.: US 7,650,251 B2
(45) Date of Patent: *Jan. 19, 2010

(54) SYSTEM AND METHOD FOR RULE-BASED DATA MINING AND PROBLEM DETECTION FOR SEMICONDUCTOR FABRICATION

(75) Inventors: Robert J. Baseman, Brewster, NY (US); Fateh A. Tipu, Wappingers Falls, NY (US); Sholom M. Weiss, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/333,830

(22) Filed: Dec. 12, 2008

(65) Prior Publication Data

US 2009/0093904 A1     Apr. 9, 2009

(51) Int. Cl.
*G01N 37/00* (2006.01)
(52) U.S. Cl. .............................. 702/81; 702/179; 700/9; 700/28; 700/32; 700/108
(58) Field of Classification Search .................. None
See application file for complete search history.

(56) References Cited

U.S. PATENT DOCUMENTS

| | | | |
|---|---|---|---|
| 5,659,467 A | 8/1997 | Vickers | |
| 6,157,899 A | 12/2000 | Venkataraman et al. | |
| 6,304,773 B1 | 10/2001 | Taylor et al. | |
| 6,470,229 B1 | 10/2002 | Wang et al. | |
| 6,907,369 B1 | 6/2005 | Markle et al. | |
| 6,950,716 B2 * | 9/2005 | Ward et al. | 700/121 |
| 6,965,895 B2 | 11/2005 | Smith et al. | |
| 7,127,304 B1 | 10/2006 | Gould et al. | |
| 2003/0229410 A1 | 12/2003 | Smith et al. | |
| 2006/0052897 A1 | 3/2006 | Liao | |

OTHER PUBLICATIONS

Strobel et al., A data mining approach to the joint evaluation of field and manufacturing data in automotive industry, Sep. 2006, Springer-Verlag, 10th European Conference on Principal and Practice of Knowledge Discovery in Databases, p. 625-32.

Love, et al., A Knowledge-Based Approach for Detection and Diagnosis of Out-Of-Control Events in Manufacturing Processes, 1989, IEEE, pp. 736-741.

* cited by examiner

*Primary Examiner*—Eliseo Ramos Feliciano
*Assistant Examiner*—Mi'schita' Henson
(74) *Attorney, Agent, or Firm*—Whitham, Curtis, Christofferson & Cook, P.C.

(57) ABSTRACT

A fabrication history a group of wafers is provided, having a record for each wafer of the manufacturing events that did or did not occur in its fabrication, and having the measured value of a given target. A binary decision rule is formed based on the fabrication history, the rule being that if a wafer has a particular pattern of manufacturing events in its fabrication history then the statistic of the given fabrication target for that wafer is a first value; otherwise, the statistic is a second value having at least a given distance from the first value. The pattern of manufacturing events in the binary decision rule is identified in the generation of the binary decision rule. The identified pattern is significant with respect to the given target.

11 Claims, 5 Drawing Sheets

| WaferID$_w$ | Step$_{x1}$_Tool$_{y3}$ | Step$_x$_Tool$_y$ | Step$_{x2}$_Tool$_{y1}$ | Yield (WaferID$_w$) | PM (WaferID$_w$) |
|---|---|---|---|---|---|
| WaferID$_1$ | 0 | ... | 0 | 75% | 1 unit |
| WaferID$_2$ | 1 | ... | 0 | 77% | 0.98 units |
| ... | ... | ... | ... | | |
| WaferID$_i$ | 0 | ... | 1 | 81% | 1.02 units |
| ... | ... | ... | ... | | |
| WaferID$_{QW}$ | 1 | ... | 1 | 84% | 0.97 units |

SYSTEM AND METHOD FOR RULE-BASED DATA MINING AND PROBLEM DETECTION FOR SEMICONDUCTOR FABRICATION

TECHNICAL FIELD

The related field is semiconductor fabrication and, more specifically, identifying patterns of manufacturing events significantly associated with target values, and identifying associated fabrication measurements.

BACKGROUND

Fabricating semiconductor integrated circuit chips (ICs) requires a large number of precisely controlled steps. Illustrative examples are forming oxide layers, printing conductor patterns (e.g. by photolithography), depositing and removing photoresist, etching circuit patterns, and implanting impurities (dopants) to form conducting regions. This is only an illustrative subset; others are known to ones of ordinary skill in the IC fabrication arts. Various fabrication tools are used to carry out these fabrication steps. Illustrative examples include stepper machines, etching machines, cleaning and dicing machines.

Various measurements and tests are performed during the IC fabrication process, generally on a random sampling basis. As known to persons of ordinary skill in the IC fabrication arts, it is physically impossible to test every feature formed by every fabrication step. After the final fabrication step, electrical performance tests are applied to the chips. Chips that pass are cut from the wafer, for subsequent packaging. Chips that do not pass are discarded. The "yield" of an IC fabrication is the percentage of the chips meeting the final electrical performance test. As known in the art, yield is crucial to the economics of IC fabrication. As one illustrative example, if an IC foundry outputs wafers with a 50% yield then, by gross averaging, approximately 50% of the foundry's resources are wasted in producing the chips.

Methods for increasing wafer yield are becoming more necessary as chip complexity increases. One reason is that increased circuit complexity generally increases the number of fabrication steps. Since defects can occur at almost any fabrication step, an increase in the number of steps operates to decrease yield. The increased number of steps also typically increases the total fabrication time. As an illustrative example, total fabrication time for a chip may exceed three months. The number of steps and fabrication time increase costs of low wafer yield. One increased cost is the "value-added" cost of the fabrication steps performed on a chip subsequent to a fatal fault in its processing.

Another increased cost is in searching for causes of chip performance deviation or low wafer yield, which may be a pattern buried within thousands of possible patterns of tools and steps. Still another example of increased cost is in migrating to, or testing a new recipe. Because of the large number of steps, and the impossibility of completely testing all wafers between fabrication steps, refining the new recipe may require substantial trial and error effort.

One method directed to reducing yield-related cost is to "bin" wafers, by measuring certain features between fabrication steps, and using the measurements to estimate the yield of the finished wafer. The estimate is based on a regression model based on measurements from previous fabrication of wafers and the wafers' respective yields. The regression model outputs an estimated yield of the tested wafer. The wafer is typically discarded if the estimated yield is below a certain minimum threshold. Defined There are shortcomings with these regression-type yield estimation methods. One is that such yield estimates are often not reliable. Another is that the estimates do not readily isolate which particular fabrication tool or step causes a yield problem.

SUMMARY OF THE INVENTION

It is therefore one object, in view of these and other problems in the related art, to provide a method and apparatus to identify a particular pattern of manufacturing events in the fabrication of a wafer as statistically significant to a given target parameter.

Another object is to provide a method and apparatus identifying fabrication measurements having information likely associated with a particular pattern of manufacturing events, which may be one event or a conjunction of events, in the fabrication history of the wafers.

The invention achieves these and other objects by generating a binary decision rule such that if wafers have a particular manufacturing event pattern in their fabrication history then they have a first value of a statistic of the given target (e.g., wafer yield, clock speed), else the wafers have a second value of that statistic.

The particular manufacturing event pattern in the binary decision rule, which is identified by the invention's generation of its binary decision rule, is the pattern that is significant with respect to the given target.

According to at least one embodiment, after the significant manufacturing event patterns is identified in the generation of the binary decision rule, measurement record taken during fabrication of the wafers are analyzed to identify which, if any, of the measurements are significantly associated with the significant manufacturing event pattern. The invention thus provides additional information for further analyzing issues regarding the significant manufacturing event pattern identified by its binary decision rule.

The manufacturing events may represent step-tool pairs, each pair being a particular fabrication step performed by a particular fabrication tool.

The present invention, and its generation of its binary decision rule, identifies significant step-tool patterns, regardless of these being buried within, for example, thousands of step-tool events over the fabrication history of a very large number of different wafers. The step-tool patterns may consist of one step-tool pair, or may be a conjunction of step-tool pairs. User definable criteria for significance of the step-tool patterns may be input, to reduce the likelihood of false identification of step-tool patterns as causing "bad" wafers.

DETAILED DESCRIPTION OF PREFERRED EMBODIMENTS

Embodiments are described by referring to specific illustrative examples. The examples are selected to facilitate a thorough understanding of the invention though illustrative operations. Other configurations, implementations and arrangements embodying or practicing one or more of the appended claims can be made and used upon reading this description, by persons skilled in the relevant arts.

In the drawings, like numerals appearing in different drawings, either of the same or different embodiments of the invention, reference functional or system blocks that are, or may be, identical or substantially identical between the different drawings.

Described examples, even referring to different figures, are not necessarily mutually exclusive. For example, a particular feature, function, act or characteristic described in one embodiment may, within the scope of the appended claims, be included in other embodiments.

Example operations described in block flow chart form are to explain and enable understanding of the invention by reference to specific examples. The appended claims may be practiced by sequences, segmentations and combinations of operations not according to the depicted blocks.

As will be readily understood by persons skilled in the art, details of certain statistics and data mining algorithms, and of certain IC fabrication methods are omitted or simplified, to better focus on and avoid obscuring the novel features, combinations, and structures of the present invention. Further, numerous specific details are provided only as explanatory examples, to facilitate a thorough understanding of the invention, but are not necessary to practice the invention, or their detailed description is not necessary for persons skilled in the IC fabrication arts to practice the invention.

The following definitions apply, except where otherwise stated:

"Recipe" means the set of values completely defining the operating action by a tool to perform a specific step and includes, but is not limited to, the ordinary and customary meaning of "recipe" to persons skilled in the IC fabrication arts at the time of this invention. As one illustrative example, a recipe for a typical chemical vapor deposition (CVD) tool includes, for example, the different gases to form the film, the flow rates of the gases, the temperature of the wafer or power to heating elements during deposition, the chamber vacuum, and the time duration of the process. These are only illustrative tool values necessary for a CVD recipe. Others are known to ones skilled in the IC fabrication arts and, therefore, are omitted.

"Step-tool" means a specific step, according to a specific recipe, performed by a specific tool. As an illustrative example, using an example labeling scheme of "$Step_x$ $Tool_y$", "$Step_x$ may be a specific ion-implanting recipe "X," on a specific ion implanting tool "Y." It will be understood that different values of the index "y" of $Tool_y$ do not necessarily identify different pieces of fabrication equipment; the different y values may identify different modes or configurations of the same piece of fabrication equipment.

"Given Target" means any testable, measurable or detectable characteristic of the wafer, or of any structure formed on or in the wafer, at any step of the fabrication. The objective of the general embodiments Illustrative examples include chip clock speed, wafer yield, power consumption and physical characteristics, such as a conductance or a carrier mobility value. The given target may be for a completed chip, or may be an in-process characteristic for a chip or for a test portion of a wafer. These are only illustrative examples. Other given targets will be become apparent to persons skilled in the arts upon reading this disclosure.

"Good" and 'Bad' are opposite, but arbitrary labels for wafers, characterizing whether the measured, tested or detected value of the given target in the wafer meets or does not meet a given discrimination criterion; "good" and "bad" are also used, as will clear from the context, to characterize a sub-group of wafers for which a statistic of the measured, tested or detected value of the given target has a significant difference, in a given "good" or "bad" direction, from the statistic of the same measured, tested or detected value of the given target for the overall group of wafers.

"Chip" or "chips" means the end product integrated circuit device fabricated on the wafer. As an illustrative example, a chip may be a microprocessor.

"Lot" means a group of wafers that proceed together, from fabrication tool to fabrication tool, during the manufacturing process. As one illustrative example, a lot may consist of 25 wafers.

The general embodiments assume a fabrication history record of each of a preferably large plurality of wafers. The fabrication history may be provided or constructed. The fabrication history record preferably represents all possible manufacturing events that occurred during the fabrication of any of the wafers. The invention may be practiced, however, using a fabrication history record that omits manufacturing events, but performance may be reduced, as will be understood upon reading this disclosure.

According to general embodiments, the fabrication history is preferably provided, or constructed to identify, for each wafer, which of the manufacturing events occurred and which did not occur in the wafer's fabrication. Further, the fabrication history is preferably provided, or constructed such that each wafer's fabrication history record includes a measured value of at least one given target for the fabrication of the wafers. Example targets are wafer yield, clock speed, power dissipation, particular path conductance, or other physical or operational parameter. The given target may be for completed chips or may be a characteristic measured, tested, or detected during fabrication of the wafer.

The general embodiments generate, based on analysis of the fabrication history records, a binary decision rule, which may be represented for purposes of explanation as: IF a wafer has a particular pattern of manufacturing events in its fabrication history THEN the statistic of the given fabrication target for that wafer (e.g., wafer yield, clock speed) is a first value, ELSE the statistic is a second value. The binary decision rule is preferably generated such that the difference between the first value and the second value meets a given difference or distance criterion. The statistic may, for example, be an arithmetic mean or average, or may be an arithmetic median, a variance or a standard deviation.

As will be understood, the pattern of manufacturing events in the binary decision rule is identified in the generation of the binary decision rule. The pattern of manufacturing events that is significant (if such a pattern exists for the wafers represented by the fabrication history record) with respect to the given target is therefore identified by the generation of the binary decision rule. The identified pattern may be a single manufacturing event, or may be a combination of manufacturing events. The magnitude (e.g., ten percent lower average yield) of the significance is also calculated by the embodiments' generating of the binary decision rule.

Therefore, according to the general embodiments, a binary decision rule is generated, which identifies a pattern of manufacturing events significant to a given target, and which identifies the magnitude of the significance.

According to at least one embodiment, the pattern of manufacturing events forming the binary decision rule is identified by applying rule induction to the fabrication history records. The rule induction may be in accordance with conventional rule induction algorithms. A maximum rule size constraint, such as three manufacturing events, may be employed in the rule induction's forming the pattern of significant manufacturing events. The example maximum rule size constraint of three is only illustrative. Rule induction algorithms are known and, therefore, description of the algorithm's various details is omitted. Persons skilled in the relevant art can, based on this disclosure, readily select and combine a conventional rule induction to this disclosure and practice one or more of the appended claims. Further, for the interested reader, various technical publications describing such details are known and available. Two illustrative examples are: Weiss, S. and Indurkhya, N., Rule-Based Regression, Proceedings International Joint Conference on Artificial Intelligence, pp. 1072-1078 (1993); and Indurkhya, N. and Weiss, S., Solving Regression Problems with Rule-based Ensemble Classifiers, Proceedings ACM SIGKDD International Conference on Knowledge Discovery and Data Mining), 287-292 (2001).

As will be understood by persons skilled in the relevant arts, although embodiments may be configured in combinations having rule induction, a reduced computational overhead may be desired.

Accordingly, one general embodiment, identifies the pattern of manufacturing events forming the IF-THEN-ELSE binary decision rule by data mining the fabrication history records of the overall group of wafers. As will be understood in view of this disclosure, this provides significantly reduced computational overhead compared to rule induction. Various known data mining algorithms may be selected and combined with this disclosure to practice one or more appended claims. One example data mining algorithm that may be combined into a practice of the claims is the binary regression tree algorithm. Regression tree algorithms are known and, therefore, description of the regression tree algorithms' various details is, except in description of specific examples, omitted. Further, various technical publications describing such details are known and available to persons skilled in the art. One example is J. Friedman, et al., Classification and Regression Trees, Wadsworth (1984).

According to at least one embodiment, after the significant pattern of manufacturing event(s) is identified in the generation of the binary decision rule, records of measurements made during fabrication are analyzed to identify which, if any, of the measurements have significant differences depending on whether they are measurements of wafers having the identified pattern of manufacturing event (referenced herein as "in-pattern wafers") or of wafers not having the identified pattern of manufacturing events (referenced herein as "out-of-pattern wafers.") This identification provides additional information for further analyzing issues regarding the manufacturing events identified as significant by its binary decision rule.

According to one more embodiments, the fabrication history of the overall group may be stored as a table of records, one record for each wafer. The records may be arranged as rows, further arranged as, for example, one row per wafer. The manufacturing events may be fabrication steps, performed by fabrication tools and, as such, may be represented as step-tool pairs, each identifying a particular step performed by a particular tool (or particular mode or configuration of a tool), as defined above. The fabrication history may be arranged as a table of rows, one row per wafer, each row having R columns, each column being step-tool pair attribute, where R is the total number of step-tool pairs used anywhere in the fabrication history of any of the overall group of wafers. The value of each of the R step-tool pair attributes may, for example, be a binary "true/false" value indicating whether or not that specific step-tool pair was applied in the fabrication of the wafer. Each of the R step-tool pairs may appear as a column in the fabrication record of each wafer.

According to at least one embodiment, the IF-THEN-ELSE binary decision rule may be generated by evaluating all, or a certain subset of all step-tool patterns for possible inclusion in the decision rule. The evaluation may include splitting the wafers into an in-pattern group and an out-of-pattern group (with respect to the step-pool pattern(s) being evaluated), calculating a statistic (such as the average or median) of the value of the given target for wafers in the overall group and for the wafers forming the in-pattern group, and comparing the two statistics. Continuing with this example, if the difference between the two statistics, e.g., the average yield of the in-pattern wafers compared to the average yield of the overall group of wafers, exceeds a given distance then the evaluated step-tool pattern is added to a preliminary combination of step-tool patterns. As will be understood, the identified fact that the statistic of the given fabrication target for the in-pattern wafers differs from the statistic of the overall group of wafers (preferably by at least the given distance) indicates the step-tool pattern is significant with respect to the given statistic.

According to at least one embodiment, generating the IF-THEN-ELSE binary decision rule includes a filtering according to the quantity of wafers in the in-pattern group and the number of wafers in the overall group. One illustrative example is the number of wafers being greater than approximately two hundred. Further, the number of wafers is preferably selected such that the overall group includes wafers from a minimum number of lots. The embodiments thus identifies step-tool patterns having a given likelihood of significance with respect to a given target, e.g., chip yield or chip speed, while minimizing false indication of step-tool patterns being faulty or otherwise significant According to at least one embodiment, test measurements taken during the fabrication may be stored as a test history table. The test history table may be an incomplete, random sampling of the wafers. Further to the embodiments, the overall groups of wafers is separated into an in-pattern group and an out-of-pattern group, based on the generated IF-THEN-ELSE binary decision rule, and the test history table is analyzed through, for example, hypothesis testing to identify which, if any, of the test measurements are significant relative to the step-tool pattern identified in generating the rule. This provides valuable information, helpful for persons skill in the art to determine issues or problems associated with step-tool patterns identified by the data mining According to at least one embodiment, data mining of the fabrication step-tool history of the overall group of wafers is performed to generate a preliminary combination of step-tool pairs by constructing a binary regression tree, identifying certain step-tool pairs as branching rules, and then pruning the tree to the given maximum rule size. One example includes constructing a binary regression tree to a given preliminary tree depth, and then pruning the tree to a depth equal a given maximum rule size.

According to one specific illustrative example, a binary regression tree may be formed starting with a root node having the overall group of wafers, and identifying the $Step_{x\_}Tool_y$ decision rule that best splits the root into two sub-nodes, or leaves, repeating the process by identifying the respective $Step_{x\_}Tool_y$ decision rules that best spit each leaf into two sub-leaves, and repeating the process until no further significant splitting can be identified.

As one illustrative example, assume wafer yield as the given target, and assume average wafer yield as the given statistic used for splitting. Further, assume an overall group of three hundred wafers, assume a given threshold minimum of wafers in each group formed in constructing the binary regression tree as twenty wafers, and assume a minimum distance of 2%. All of these assumed quantities and values are only illustrative, hypothetical examples picked for describing an operation. Further, assume the global average yield, i.e., the average yield of the overall group of wafers, is 80%. In the formation of the binary regression tree, assume arbitrary pair $Step_{x1\_}Tool_{y2}$ is tested as a rule to split the root into two sub-leaves. Assume, as an arbitrary example, there are thirty in-pattern wafers, i.e., wafers having $Step_{x1\_}Tool_{y2}$ in their fabrication history. Assume the average yield of the in-pattern wafers is 79%. Since the difference of the in-pattern statistic of 79% and the global statistic of 80% does not exceed the given 2% distance threshold, the $Step_{x1\_}Tool_{y2}$ pair is not identified as a splitting rule. Preferably, the evaluation compares the in-pattern statistic to the global (or parent node) statistic, and does not weigh the out-of-pattern statistic. The present inventors have identified this as better identifying significant step tool patterns.

Continuing with the example, assume arbitrary pair $Step_{x4\_}Tool_{y5}$ is tested, and that splitting based on $Step_{x4\_}Tool_{y5}$ results in twenty-five in-pattern wafers, having an average yield of 77%. Since the average yield of the in-pattern group obtained by splitting with $Step_{x4\_}Tool_{y5}$ meets the 2% given threshold, $Step_{x4\_}Tool_{y5}$ is identified as a splitting rule. The process continues until the $Step_{x\_}Tool_y$ rule providing the best split of the overall group of wafers is identified. The process is then repeated on the two nodes branching from the root (the in-pattern child node and the out-of-pattern child node) until no further $Step_{x\_}Tool_y$ patterns can be identified as splitting rules.

The binary decision may, for example, be grown to depth equal to the total number manufacturing events (e.g., the total number of step-tool pairs represented in the fabrication history) and then pruned to a depth based on a given maximum rule size. Alternatively, the binary regression tree is grown to a given preliminary depth, less than the total number of manufacturing events, and then pruned to a final depth based on a given maximum rule size. Using either example, manufacturing events that are decision rules in the final pruned tree are the manufacturing event pattern for the IF-THEN-ELSE binary decision rule.

This IF-THEN-ELSE binary decision rule is then applied to split overall group of wafers into an in-pattern group and out-of-pattern group. The average of the given target is calculated for each of the two groups. The single binary rule may then be represented generically as, for example, an IF-THEN-ELSE rule such as:

IF (Wafers are In-Pattern)                    (Equation No. 1)
    THEN Statistic (Target Value) = Value__1,
        ELSE Statistic (Target Value) = Value__2

As an illustrative example, assume manufacturing events are represented as step-tool pairs, assume the final pruned binary regression tree has a depth of two, and assume the splitting rules in the tree are $Step_{x4\_}Tool_{y5}$ and $Step_{x15\_}Tool_{y9}$, the IF-THEN-ELSE binary decision rule would be IF ($Step_{x4\_}Tool_{y5}$ and $Step_{x15\_}Tool_{y9}$)
    THEN Statistic (Target Value) = Value__1,
        ELSE Statistic (Target Value) = Value__2

As described above, the "statistic" in Equation No. 1 may be any kind of statistic the user desires to use as a basis for determining which, if any, pattern of $Step_{x\_}Tool_y$ pairs is significant to the given target. Example kinds of statistics include, without limitation, average target value, median target value, variance of the target value and standard deviation of the target value. For example if the "statistic" is Equation No. 1 is the median of the target value, the equation may be represented as the following Equation No. 2.

IF (Wafers are In-Pattern)                    (Equation No. 2)
    THEN Median (Target Value) = Median Value__1,
        ELSE Median (Target Value) = Median Value__2

Similarly, if the "statistic" in Equation No. 1 is an average, and the Target Value is a particular physical feature dimension, such as "FeatureZ_Width," the equation may be represented as the following Equation No. 3.

IF (Wafers are In-Pattern)                    (Equation No. 3)
    THEN Average (FeatureZ_Width) = Average Value__1,
        ELSE Median (FeatureZ_Width) = Average Value__2

As one illustrative example, assuming a yield related issue with, for example, arbitrary step-tool $Step_{x3\_}Tool_{y6}$, wafer yield as the given target and average yield as the given statistic, an example according to one embodiment may generate a binary decision rule having a form such as:

IF ($Step_{x3\_}Tool_{y6}$)
    THEN Avg (Wafer Yield) = Value__1 (percent),
        ELSE Avg (Wafer Yield) = Value__2 (percent),
where Value__1 (percent) would be lower than Value__2 (percent).

As one variation of this illustrative example, and assuming a yield related defect or issue associated with a step-tool pattern of ($Step_{x4\_}Tool_{y9}$ AND $Step_{x2\_}Tool_{y9}$) an example according to one embodiment may generate a binary decision rule having a form such as:

IF ($Step_{x4\_}Tool_{y9}$ AND $Step_{x2\_}Tool_{y9}$)
    THEN Avg (Wafer Yield) = Value__1 (percent),
        ELSE Avg (Wafer Yield) = Value__2 (percent),
where Value__1 (percent) would, again, be lower than Value__2 (percent).

The number of conjunctive step-tool events in the above hypothetical example pattern is two. The example of two conjunctive events is an illustrative number, not a limitation. The present inventors have identified that, at least with respect to a conventional IC fabrication environment; two or three is an example maximum number of step-tool events likely to have statistical significance.

To assist in better understanding the invention, example embodiments and their respective operations are described in reference to conventional IC foundries and methods. These are only examples, though, not a limitation. Embodiments may be practiced in, or in combination with any fabrication environment in which the step-tool history of a wafer can be recorded.

Figure 1:
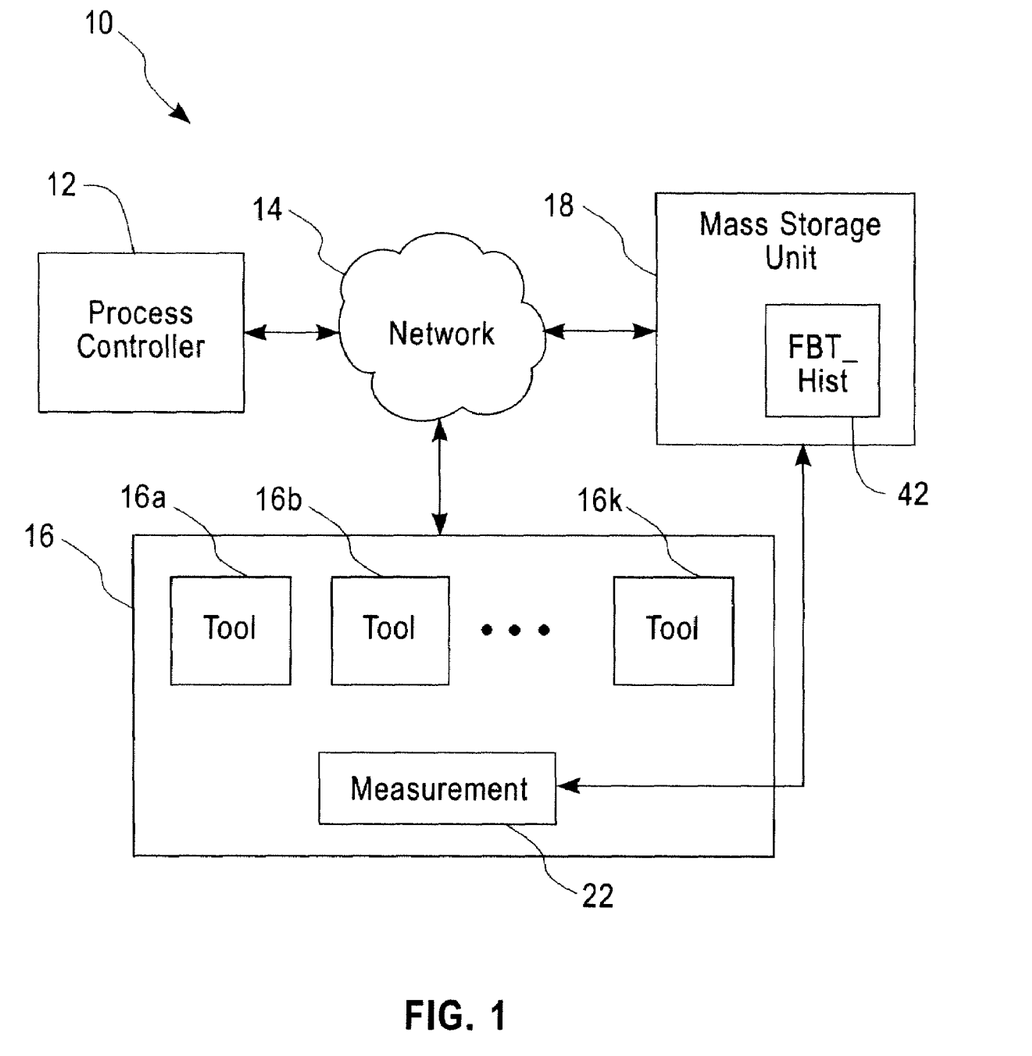
FIG. 1 illustrates one general system architecture in accordance with at least one embodiment.

FIG. 1 illustrates one example environment 10 for practicing various embodiments of the invention. The example environment 10 includes a process controller 12, connecting through a network 14 to an IC fabrication tool resource 16 and a mass storage device 18. The process controller 12 may include various information user interface, data storage and processing functions, steps and/or operations (collectively "operations"), described below. The operations may be embodied in machine-executable instructions, which may be stored on a machine-readable medium, located within or accessible by the controller 12, which may cause the process controller 12 to perform the operations.

Figure 2:
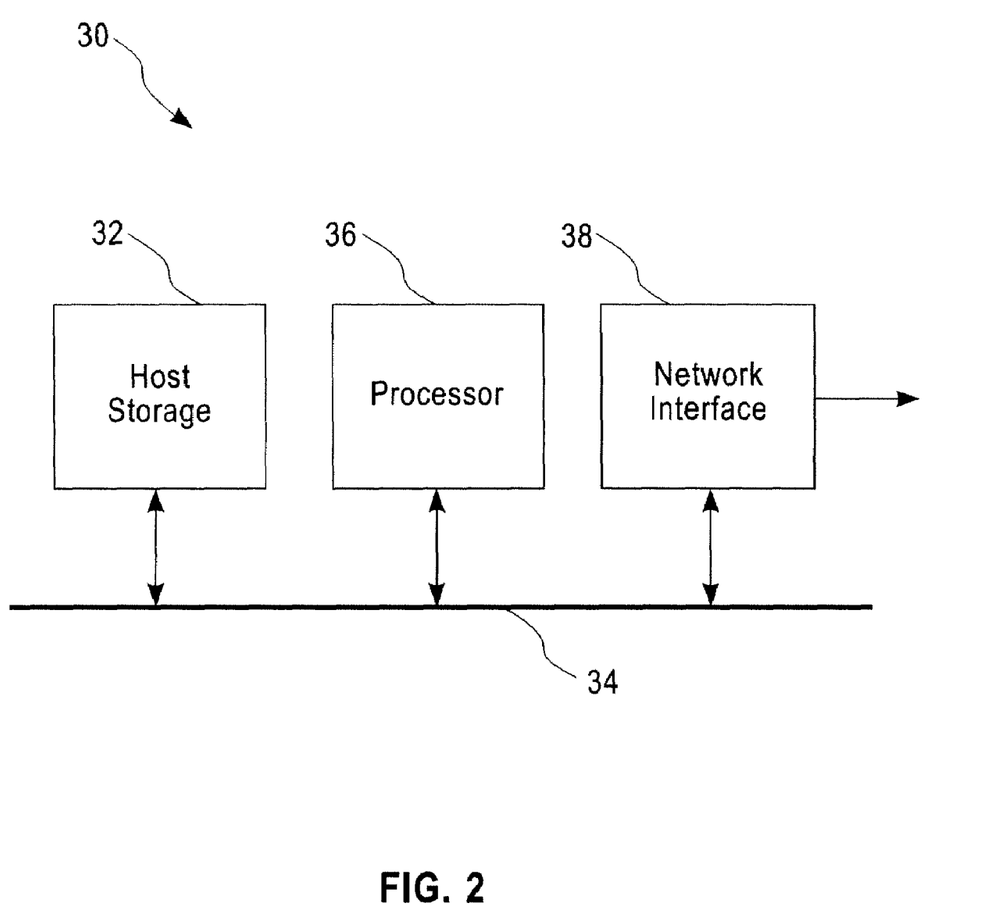
FIG. 2 illustrates a high level flow diagram of one example controller of the FIG. 1 example architecture.

FIG. 2 shows a high-level functional block diagram of one example controller 30 to implement the controller 12 of the FIG. 1 environment. The FIG. 2 example controller 30 includes a host storage unit 32 having a machine-readable storage medium to store machine-executable instructions (not separately labeled), a host bus 34 connecting host storage unit 32 and a processor 36 constructed and arranged to perform the operations according to the machine-executable instructions. Processor 36 may be any type or architecture of digital processor having an instruction set sufficient to perform the following described operations. Host storage unit 32 may include, for example, solid-state random access memory, magnetic disk devices and/or optical disk devices. Referring to FIGS. 1 and 2, a network interface 38 connects the processor 36 through network 14 to the mass storage device 18.

Mass storage device 18 represents a function without limitation as to hardware or architecture. For example, mass storage device 18 may be physically remote from the fabrication resource 16 and connected, for example, via network 14 or equivalent. As illustrative examples, mass storage device 18 may be a distributed resource; embodied by physical memory such, for example, host storage unit 32 of process controller 12, or memory (not shown) within controllers (not shown) associated with individual fabrication tools 16n.

The process controller 12 and the mass storage device 18 may be implemented as, or within, commercially available "manufacturing execution systems" (MES) such as, for example, the Poseidon™ MES or SiView™ MES available from IBM Corporation, or other MES systems available from other vendors.

Referring again to FIG. 1, fabrication tool resource 16 has a plurality of K fabrication tools, labeled 16a, 16b . . . 16K, generically referenced as 16n. Fabrication tools 16n comprise tools used in IC fabrication such as, for example, photolithography tools, chemical vapor deposition (CVD) tools, physical vapor deposition (PVD) tools, etching, thermal oxidation and rapid thermal annealing (RTA) tool, ion implantation and chemical mechanical polishing (CMP) tool. As understood by ones skilled in the art, these are only illustrative examples of IC fabrication tools 16n. Fabrication resource 16 may, but does not necessarily, have more than one tool 16 of the same kind. For example, fabrication tools 16c and 16d may both be CVD tools. Further, tools referenced by different labels, e.g. 16x, 16y, may be the distinctly different configurations or modes of the same unit of equipment.

With continuing reference to FIG. 1, the fabrication history record 42 is shown within the mass storage device 18, but this is only an illustrative example. The fabrication history record 42 is a functional block, not a hardware unit, and may reside in the process controller 12, and may include various sensing and I/O devices (not shown) included in or with the various fabrication tools 16, or with conveyance devices (not shown) for transporting or conveying wafer lots from one tool 16 to another tool 16.

With continuing reference to FIG. 1, a measurement resource, represented as block, 22 may be included in the example environment 10, to perform certain measurements on wafers between processing steps (not shown in FIG. 1) performed by the fabrication tools 16. The measurement block 22 represents a plurality of measurement tools and measurements performed. Block 22 is not limited to any specific hardware or to any specific test or measurement methods. Measurement resource 22 may, for example, be implemented in accordance with conventional IC fabrication test and measurement equipment and methods. Illustrative examples (not shown) include, without limitation, optical measuring tools, such as microscopes and spectral line width measurement tools, electrical parameter measuring tools such as, for example, contact resistance measurement tools, carrier concentration and mobility measurement tools, junction depth measurement tools, and gate oxide integrity test tools. These are only illustrative examples. Others will be apparent to those skilled in the art upon reading this disclosure.

Figure 3:
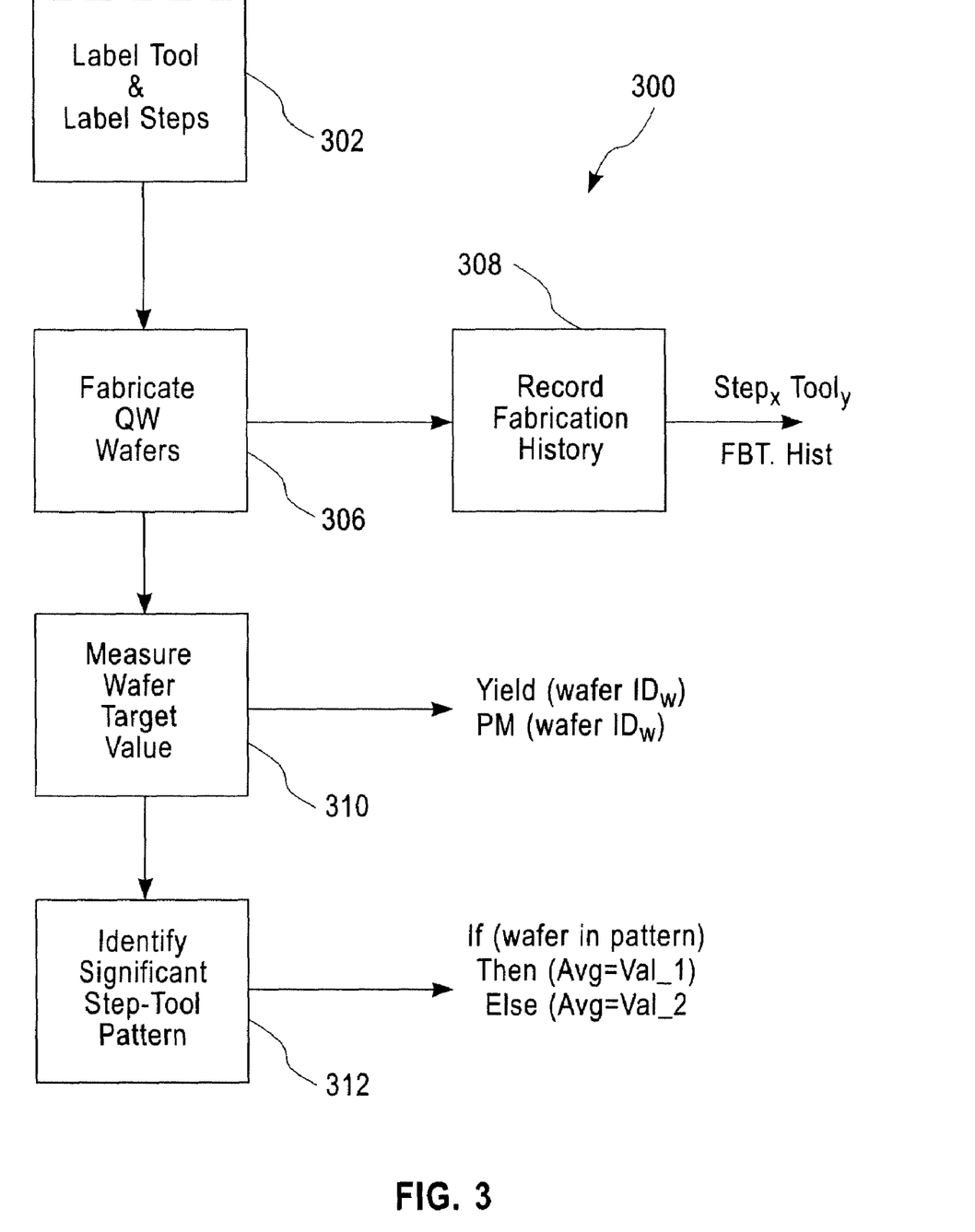
FIG. 3 illustrates, in graphical form, a functional flow diagram of one data mining based identification of step-tool patterns significant to a target characteristic.

FIG. 3 illustrates a high level functional flow diagram of one data mining identification 300 of step-tool patterns significant to a given target. The data mining identification 300 assumes wafers enter the fabrication already marked with unique machine-readable identifier, $WaferID_w$, w being an arbitrary identification index, and that containers for transporting wafer lots from machine tool to machine tool are also marked with a machine-readable identifier, such as LotID. Techniques for applying such identifiers to wafers and wafer lot containers are known.

Referring to FIG. 3, at 302 an arbitrary label such as, for example, $Tool_x$, x=1 to K, is assigned to each of the K fabrication tools 16. An arbitrary label such as, for example, $Step_y$, is assigned to each of the M fabrication recipes performed by the foundry, at least on the wafers in a given production study. Labeling 302 may be within a conventional MES or other IC foundry automation system.

Referring to FIG. 3, at step 306 the wafers are fabricated on the fabrication resource 16. As known in the art, fabrication includes conveying the wafers from one tool 16 to another tool 16, downloading (not shown) various recipes from the process controller 12 to the tools 16, and various data communications between the fabrication tools 16 and process controller 12. The fabrication may be in accordance with conventional IC fabrication methods and, therefore, further details are omitted. In accordance with conventional IC fabrication, in-process electrical and optical measurement may be performed between fabrication steps, typically on a subset of the wafers.

With continuing reference to FIG. 3, concurrent with fabrication step 306 recording step 308 records the fabrication history, as a record labeled as, for example, FBT_HIST. Preferably, steps 306 and 308 are continued until FBT_HST has the fabrication history for a given quantity of wafers, the quantity labeled in this description as QW, large enough for the binary decision rule generated to have a given confidence.

Preferably, the quantity QW is sufficient to include a given minimum quantity of lots, referenced in this description as QL.

Figure 4:
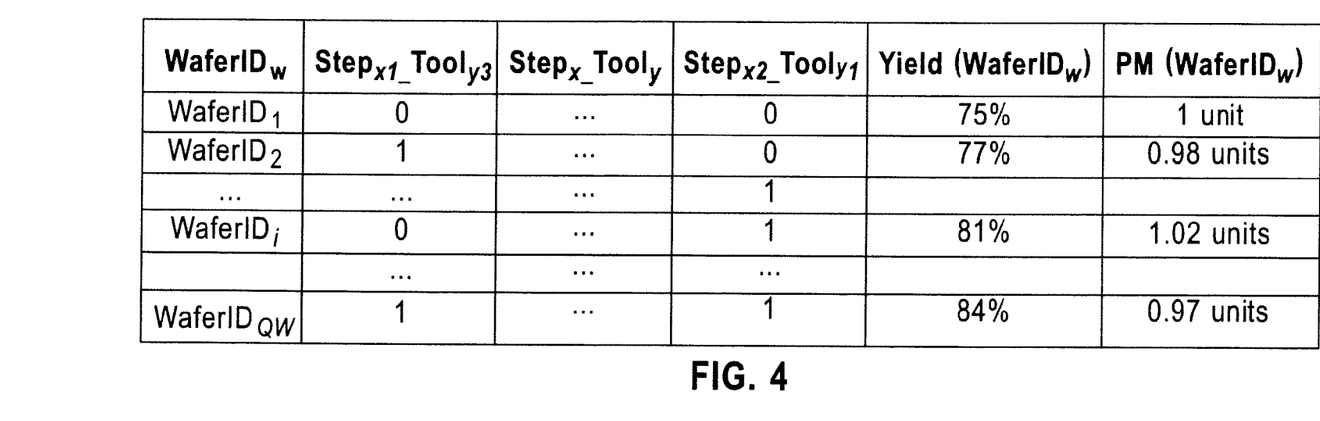
FIG. 4 illustrates, in graphical form, one example step-tool history table formed for a data-mining according to FIG. 3.

FIG. 4 depicts an example portion of one illustrative FBT_HIST table, having QW rows, one for each wafer, each row having R columns, one column for each and every step-tool pair the fabrication resource 16 may apply in fabricating the wafers. In the FIG. 4 example, an entry of "1" indicates the $Step_x\_Tool_y$ event occurs in the fabrication of the wafer, and an entry of "0" indicates the $Step_x\_Tool_y$ event does not occur.

Referring to FIGS. 3 and 4, when wafer fabrication 306 and fabrication history recording 308 are complete, target measurement step 310 is performed. Target measurement step 310 measures the value of the given fabrication target for which the step-tool pairs are evaluated for significance. Assuming the given target is wafer yield, step 310 generates a value that may be labeled as $Yield(WaferID_w)$. Alternatively, assuming the given target is a chip physical characteristic the step 310 value may be labeled as $PM(WaferID_w)$.

It will be understood that embodiments may generate IF-THEN-ELSE rules, and identify manufacturing event (e.g. step-tool) patterns significant to a given target in an environment separate from the fabrication of the IC's. For example, a fabrication history generated as described in reference to blocks 308 and 310 may simply be provided to a processing environment such as, for example, the environment described in reference to FIGS. 1 and 2.

Referring again to FIG. 3, after the target measurement 310 is performed on the QW wafers to complete the fabrication history (e.g., Fab_Hist), (or after the fabrication history is provided), step 312 identifies the pattern of $Step_x\_Tool_y$ pairs (if any such pattern exists for those particular QW wafers), that are significantly associated with the given target. Assume, as an example, the target is wafer yield where each wafer's fabrication history record includes a measured value of $Yield(WaferID_w)$. Further assume the statistic for forming the binary decision rule is the average yield. On these assumptions, step 312 identifies the pattern of $Step_x\_Tool_y$ pairs (which may one pair or a conjunction of pairs) that best splits the QW wafers into to an in-pattern group and an out-of-pattern group, where the Avg(Yield (group of in-pattern wafers)) is significantly lower (or higher), according to a user-defined criterion of significance, than the global average, i.e., Avg(Yield (all QW wafers).

The step 312 identifying may be configured to identify the pattern of $Step_x\_Tool_y$ pairs significant to fabricating "bad" wafers or may be configured to identify the pattern of $Step_x\_Tool_y$ pairs significant to fabricating "good" wafers. Persons of ordinary skill in the IC fabrication arts may use the $Step_x\_Tool_y$ pattern identified by step 312, if configured to identify "bad" wafers in generating the IF-THEN-ELSE rule, to perform investigative and, if necessary, remedial action relating to the particular tool(s) 16 and recipe(s) associated with the identified $Step_x\_Tool_y$ pattern. Further, ones skilled in the arts may, if step 312 is configured to identify "good" wafers, use the step-tool pattern, and the magnitude of the difference between the in-pattern statistic and the global statistic in the IF-THEN-ELSE rule, for further analysis into improving the IC fabrication.

Figure 5:
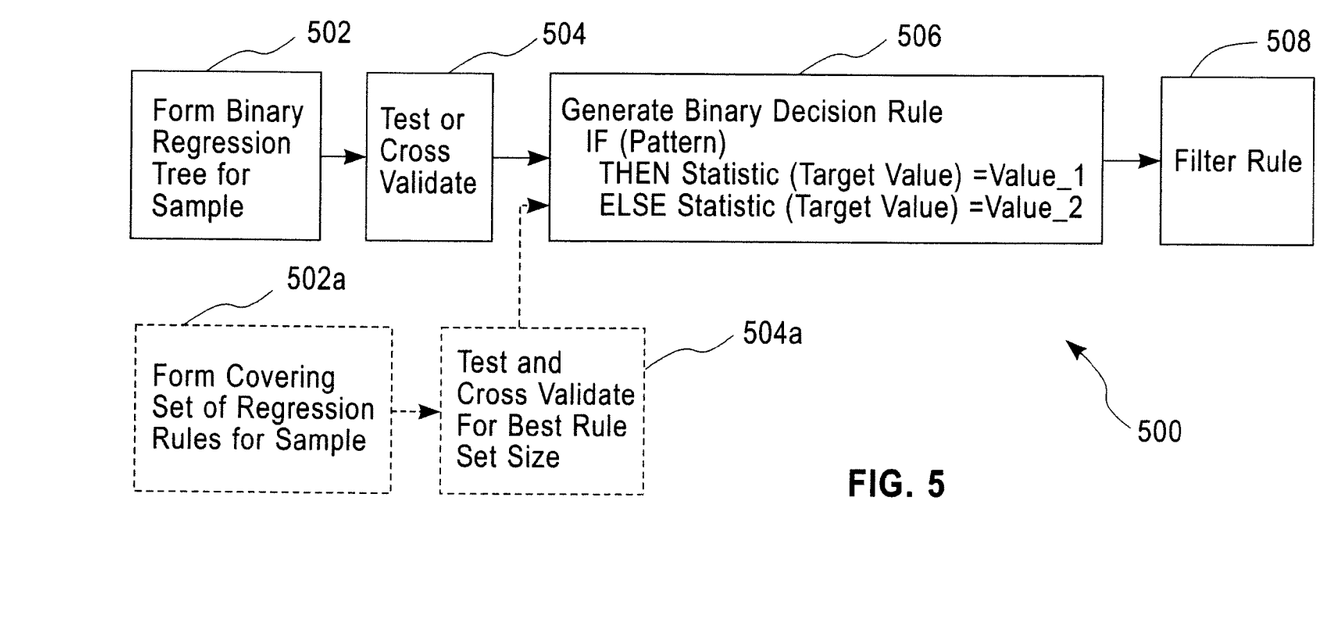
FIG. 5 illustrates, in graphical form, a functional flow diagram of one example binary regression tree implementation of a pattern identification of the FIG. 3 functional flow diagram.

FIG. 5 shows a functional flow diagram of one example 500 of a data mining based implementation of the step 312 generation of the binary decision rule, the rule being according to any of Equation Nos. 1-3 above. As described, the binary decision rule identifies the step-tool pattern significant to the given target. In general overview, the example 500 receives a given preliminary tree depth and a final tree depth. The final tree depth is no more than the maximum rule size, i.e., the maximum number of step-tool pairs in the pattern of step-tool pairs in the final binary decision rule. The example 500 grows or forms a binary regression tree to the preliminary tree depth, and then prunes the tree to the final tree depth.

Referring again to FIG. 5, step 502 grows a binary regression tree to the preliminary depth. The preliminary depth may be R, R being the total number of step-tools in the fabrication history table FBT_HIST recorded at step 308. As known in the general art of binary regression trees, the preliminary depth may be a smaller number such as, for example, teen. Step 502 may be in accordance with conventional methods of forming a binary regression tree, as known in the data mining arts. Then step 504 tests or cross-validates to obtain a best size tree. Step 504 may, for example, test cross-validate according to known binary regression tree formation methods. At the completion of step 504 each path to a terminal node of the resulting binary regression tree is a potential rule. Next, step 506 generates an IF-THEN-ELSE type binary decision rule such as, for example, Equation No. 1, based on the binary regression tree resulting from step 504. Step 506 is invoked because the binary regression tree resulting from step 504 typically includes rules based on lengthy conjunctions of step-tool pairs, including many pairs having little, if any, actual significance with respect to the target, e.g. wafer yield.

One example for performing step 506 is according to the general outline as follows:
  i) Determine whether a shorter rule is competitive with a complete path to a terminal node of the regression tree,
  ii) Consider a maximum rule length j, i.e., the maximum number of step-tool pairs in a conjunction rule in the, where an example value of j equals two
  iii) Examine each node, both terminal or nonterminal
  iv) If result using just that node (step-tool) is close to (or better) than the full path to that node, then the single node replaces the full path.
  v) If (iv) fails then, if the result using the current node and one of its parents is close to (or better) than the full path to that node, the single conjunction replaces the full path.

Next, step 508 filters the IF-THEN-ELSE rules generated by step 506. The filter rules performed by step 508 preferably include the following:
  Rule must cover, i.e. split, a group having at least a given quantity QW wafers, where the number QW exceeds a given minimum,
  Rule must cover a given minimum of lots, i.e., the quantity of wafers must both exceed the given minimum QW and must include wafers processed by at least the given minimum number of lots,
  Rule must split the overall group of wafers into an in-pattern group and out-of-pattern group such that the given statistic, e.g., average, median or variance, of the value of the given target (e.g., yield, clock speed) for wafers in the in-pattern group must differ from that statistic of the overall group by a given minimum distance.
  Rule must split the overall group of wafers into an in-pattern group and out-of-pattern group such that the given statistic of the value of the given target for wafers in the out-of-pattern group must differ from that statistic of the overall group by a given minimum distance.

The $Step_x\_Tool_y$ pattern within the IF-THEN-ELSE rule generated by filtering step 508 provides statistically useful information to better perform investigative and, if necessary, remedial or other action relating to the particular tool(s) 16 and recipe(s) associated with the identified $Step_x\_Tool_y$ pattern.

Referring again to FIGS. 3 and 5, the step 312 generation of the IF-THEN-ELSE binary decision rule of, for example Equation Nos. 1-3, may be performed by an embodiment using rule induction, instead of data mining, as shown by FIG. 5 steps 502A and 504A replacing 502 and 504, respectively. Referring to FIG. 5, step 502A of the depicted example rule induction forms a covering set of regression rules based on the fabrication history FAB_HIST, and step 504A tests and cross validates to obtain a rule set having the best rule set size. Step 506 then generates the IF-THEN-ELSE binary decision rule as described above.

Figure 6:
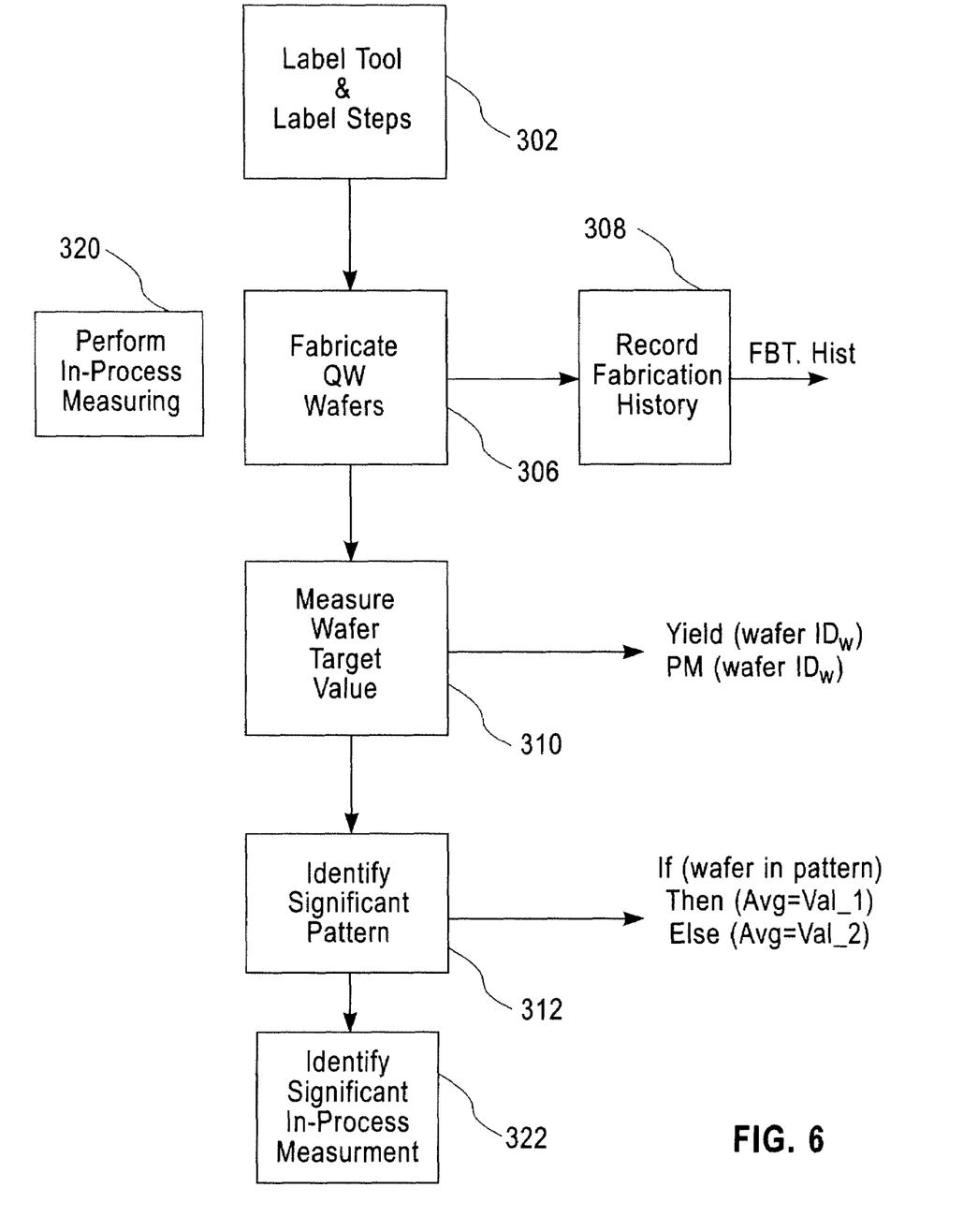
FIG. 6 illustrates, in graphical form, a functional flow diagram of one data mining based identification of step-tool patterns statistically significant to a chip target, combined with identification of wafer measurements with statistically significant differences associated with the step-tool patterns.

FIG. 6 is a high level functional flow diagram according to one embodiment having the above-described functions and features according to FIGS. 3-5, with an additional feature of identifying other wafer measurements, such as measurements taken or performed between fabrication steps, that significantly differ between the in-pattern group of wafers and the out-of-pattern group of wafers, after these groups separated by the IF-THEN-ELSE step-tool pattern rule described above.

Referring to FIG. 6, concurrent with fabrication step 306 and fabrication history recording 308, in-process measurement step 320 obtains test data, between certain of the fabrication steps performed by tool resource 16. Preferably, measuring step 320 randomly samples from among the QW wafers having their fabrication history in the FBT_HIST table generated by 308. A typical sampling percentage may be, for example, 10%. The measurements may be recorded in table form similar to the FBT_HIST table shown in FIG. 4. The table (not shown) will have missing values, corresponding to the random sampling, e.g., 10%.

The in-process measuring step 320 may, for example, be performed by the measurement resource block 22 described in reference to FIG. 1. The measuring step 320 may be performed in accordance with conventional IC fabrication test and measurement equipment and methods. Illustrative example tests include, without limitation, optical measuring and inspection, electrical parameter measuring such as, for example, contact resistance, carrier concentration and mobility measurement, junction depth measurement, and gate oxide integrity measurement. These are only illustrative examples. Others are apparent to ones skilled in the art upon reading this disclosure.

Next, step 322 splits the QW wafers having fabrication history data in FBT_HIST, using the IF-THEN-ELSE binary decision rule generated at step 312. Step 322 splits the QW wafers into an in-pattern group and an out-of-pattern group and then, using a statistical process such as, for example, hypothesis testing, identifies the in-process measurements that are significantly different between the in-pattern wafers and the out-of-pattern wafers. This provides valuable information, helpful for persons skilled in the art to determine issues or problems associated with step-tool patterns identified by the IF-THEN-ELSE binary decision rule generated at step 312.

While certain embodiments and features of the invention have been illustrated and described herein, many modifications, substitutions, changes, and equivalents will occur to those of ordinary skill in the art. It is therefore to be understood that the appended claims are intended to cover all such modifications and changes as fall within the spirit of the invention.

We hereby claim:

1. A computer implemented method for identifying manufacturing events significant to a value of a given target production quality in semiconductor fabrication, comprising:

storing in a storage unit in communication with a processor a manufacturing history record for each item of a group of items in a semiconductor fabrication process, each manufacturing history record having a unique item identifier, a target value representing a measured value of a given target, and a manufacturing event vector representing a plurality of different manufacturing events and whether or not each of the manufacturing events occurred in the manufacturing of the item;

wherein each of said plurality of manufacturing events is represented as a step-tool pair representing at least one of a particular manufacturing step and a particular manufacturing equipment used in said semiconductor manufacturing process, and wherein said manufacturing event vector for each item includes a plurality of said step-tool pair attributes, each attribute having a value representing whether or not the step-tool pair was applied in the manufacturing of the item;

generating, using said processor, a binary decision rule, the binary decision rule being in a form IF/THEN/ELSE, said generating including selecting a pattern of manufacturing events such that an in-pattern statistic differs by at least a given significance threshold from a global statistic, the in-pattern statistic being a statistic of the target value for all items of the group having the pattern of manufacturing events in the item's fabrication history record and the global statistic being the same statistic of the target value for all items of said group; and using the binary decision rule for improving or taking remedial action with respect to particular tool(s) or recipe(s) used in said plurality of different manufacturing events in said semiconductor manufacturing process.

2. The method of claim 1, wherein the statistic of the target value represents an average of the target value, said in-pattern statistic represents an average of the target value for all items having said pattern of manufacturing events in the item's fabrication history record, and said global statistic represents an average of the target value for all of said items in said group.

3. The method of claim 1, wherein the statistic of the target value represents an average of the target value, said in-pattern statistic represents an average of the target value for all items having said pattern of step-tool pair attributes in the item's fabrication history record, and said global statistic is an average of the target value for all of said items in said group.

4. The method of claim 1, further comprising:

providing a measurement database accessible by said processor, said measurement database having a measurement record for items from among said group of items, each record associated with a corresponding item, each record representing a plurality of different measurements and, for each of the plurality of different measurements, representing whether or not the measurement was performed in the fabrication of the item and, if the measurement was performed, the measured value;

splitting, using the processor, the items in the group of items into an in-pattern group and an out-of pattern group based on said binary decision rule; and identifying, using the processor, one or more of said plurality of different measurements as significantly different for said in-pattern group than for said out-of-pattern group.

5. The method of claim 4, wherein identifying one or more of said plurality of measurements as significantly different includes a hypothesis testing, using said processor, of one or more measurements from among said plurality of measurements.

6. The method of claim 1, wherein said generating a binary decision rule includes selecting a pattern from among possible patterns of the manufacturing events, said selecting based on splitting the group of items into an in-pattern node and an out-of pattern node using candidate patterns from among possible patterns, and comparing, using said processor, a statistic of the measured target value of the in-pattern node to the statistic of the measured target value for the group of items.

7. The method of claim 6, wherein said comparing includes determining if the statistic of the measured target value of the in-pattern node differs from the statistic of the measured target value for the group of items by more than more than a given distance criterion.

8. The method of claim 1, wherein said generating a binary decision rule includes selecting a pattern from among possible patterns of step-tool pair attributes, said selecting based on splitting the group of items into an in-pattern node and an out-of pattern node using candidate patterns from among possible patterns, and comparing a statistic of the measured target value of the in-pattern node to the statistic of the measured target value for the group of items.

9. The method of claim 8, wherein said comparing includes determining, using said processor, if the statistic of the measured target value of the in-pattern node differs from the statistic of the measured target value for the group of items by more than a given distance criterion.

10. The method of claim 1, wherein said selecting includes constructing, using said processor, a preliminary binary regression tree to a given preliminary depth, based on said manufacturing events as splitting rules, reducing the preliminary binary regression tree to a final binary regression tree having a given final depth, and forming said binary decision rule from said final binary regression tree, based on a given maximum binary decision rule length.

11. The method of claim 1, wherein said selecting includes forming a preliminary regression rule set based on rule induction on the manufacturing history record, reducing the preliminary regression rule set to a final regression rule set based on given maximum regression rule length, and forming said binary decision rule from said final regression rule set, based on a given maximum binary decision rule length.

* * * * *